United States Patent [19]

Posso

[11] 4,044,965
[45] Aug. 30, 1977

[54] MAGNETIC TAPE REEL FOR COMPUTER

[75] Inventor: Patrick P. Posso, Lausanne, Switzerland

[73] Assignee: Societe Anonyme dite: GEFITEC S.A., Switzerland

[21] Appl. No.: 720,367

[22] Filed: Sept. 3, 1976

[30] Foreign Application Priority Data

Sept. 19, 1975 Switzerland .................... 12217/75

[51] Int. Cl.$^2$ ............................................ B65H 75/18
[52] U.S. Cl. ................................................. 242/71.8
[58] Field of Search ............... 242/71.8, 118.4, 118.7

[56] References Cited

U.S. PATENT DOCUMENTS

| | | | |
|---|---|---|---|
| 3,346,211 | 10/1967 | Gruber | 242/71.8 |
| 3,389,872 | 6/1968 | Lyman | 242/71.8 |
| 3,410,500 | 11/1968 | Elliott | 242/71.8 |

Primary Examiner—Edward J. McCarthy
Attorney, Agent, or Firm—Weingarten, Maxham & Schurgin

[57] ABSTRACT

A reel for the magnetic tape of a computer, wherein the central part is constituted, like the side flanges, by polystyrene, which is therefore ultrasonically weldable, and these flanges are welded on said part at four spots, the ring integral with the rest of the part being connected to the web by a plurality of ribs separated from one another by spaces.

3 Claims, 3 Drawing Figures

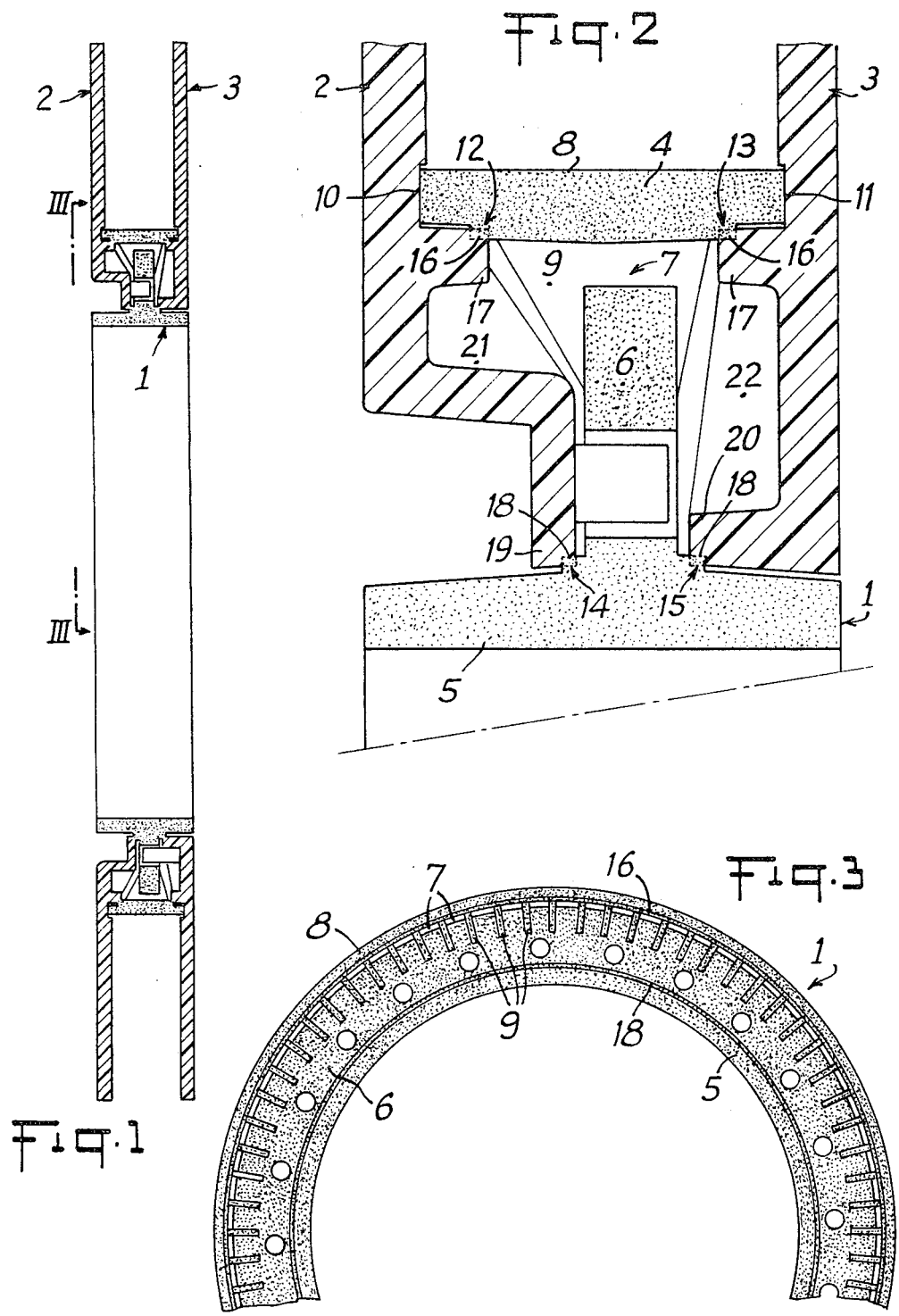

MAGNETIC TAPE REEL FOR COMPUTER

The present invention relates to a reel for the magnetic tape of a computer.

A reel of this type is described in U.S. Pat. No. 3,632,053; it comprises two side flanges, a hub and a ring on which the tape is wound. It is well known that the fact of the tape tightening whilst it is being wound causes an extremely intense compression to be exerted on the ring.

It is an object of this U.S. patent to avoid transmission of the compression both to the hub, to prevent it from tightening on the driving spindle, and to the flanges, to prevent their buckling. To this end, a clearance is provided between the ring and the flanges; these flanges are secured (particularly by ultrasonic welding if all the elements are made of polystyrene) solely to the hub, against its faces and at three points without interlocking: the connection between the ring and the hub is effected elastically by means of an intermediate ring connected alternately to one and the other by angularly offset ribs.

In this way, the ring is compressed when the tape is being wound but no stress can be transmitted to the hub nor the flanges which therefore do not risk buckling.

This reel has been constructed and tested, but has not been launched on the market, although there is a pressing demand.

Contrary to the invention described in the above U.S. patent, the purpose of the present invention is to have all the essential components of the central part of the reel participate in the resistance to compression; to this end, a box-like or caisson structure is constituted by the hub, ring and the flanges, this box-structure having to be sufficiently rigid and undeformable to avoid the hub tightening on its driving spindle, the flanges buckling and the ring losing its cylindricity, whilst the tape is being wound.

In accordance with the invention, the flanges are therefore welded to the central part in four annular zones ensuring, in two's and on each side, the rigid joining of the corresponding flange with the ring and the hub respectively in order to form a box-like structure with better resistance to the compression produced by the tape being wound and, to this end, each flange presents, on its internal face, two projecting parts each defined by a substantially cylindrical welding surface, these two surfaces cooperating with two conjugated surfaces made on the inside of the ring and the outside of the hub, respectively.

According to another important feature of the invention, each flange is provided with a joggle, for housing the corresponding free end of the ring, so that a sharp edge appears between this flange and the ring.

The invention will be more readily understood on reading the following description with reference to the accompanying drawings, in which:

FIG. 1 is a diametrical section through a reel according to the invention.

FIG. 2 is a partial view similar to FIG. 1, showing on a larger scale the mode of assembling the various components of this reel, FIG. 3 is a side elevation taken along line III—III of FIG. 1 and illustrating only the central part.

Referring now to the drawings, FIG. 1 shows a reel which comprises a central part 1 made of glass-fibre filled polystyrene and two side flanges 2, 3 also made of polystyrene which is therefore ultrasonically weldable.

The central part 1 is monolithic (FIG. 3); it has a driving ring 4 and a hub 5 fast with a web 6. Between the web 6 and the ring 4 is arranged a free space 7 due to which it becomes possible to mould said ring without risk of developing cavities and therefore to obtain a winding surface 8 which is perfectly cylindrical and having strictly straight generatrices.

The web and ring are connected together by relatively thin ribs 9 in order to avoid cavities on moulding (FIGS. 2 and 3).

The flanges 2, 3 delimit, opposite the free ends of the ring 4, joggles 10, 11 intended for supporting said ends, recessed in the inner surface of the flanges. In this way, the connection of the flanges with the ring is made with a sharp edge (FIG. 2). To ensure that these flanges 2, 3 are assembled with the central part 1, ultrasonic welding is effected at four points 12 to 15.

To this end, the ring 4 has projecting from its inner surface, between each of its free ends and the ribs 9, an annular collar 16 whose internal diameter is smaller than the external diameter of an annular boss 17 in the corresponding flange 2 or 3; in the same way, the hub 5 has projecting from its outer surface, near each side of the web 6, an annular collar 18 whose external diameter is greater than the internal diameter either of an insert portion 19 of the flange 2 or of an annular skirt 20 of the flange 3.

The emission of ultrasounds is effected at the same time as the flanges are pressed on the central part, so that the collars 16 and bosses 17 penetrate into each other to produce, by shearing and softening, the weld spots 12, 13, in the same way as the collars 18 and inset portion 19 and the skirt 20 penetrate into one another to produce, by shearing and softening, the weld spots 14, 15.

It is important to note that a slight clearance is provided between, on the one hand, the ring 4 and the bosses 17, on the other hand the hub 5 and the inset portion 19 as well as the skirt 20 in order that the ultrasonic welding action be localised at the shearing zones.

Furthermore, ribs 21 connect the boss 17 of the flange 2 to the inset portion 19 and other ribs 22 connect the boss 17 of the flange 3 to skirt 20. Due to the four weld spots 12 to 15 and to ribs 21, 22, a perfectly rigid, assembled central part is obtained, maintaining the flanges strictly parallel to each other whatever the influences to which the reel is subjected; moreover, the winding surface of the ring 8 remains cylindrical and concentric to the bore of the hub 5 with great accuracy, its generatrices being straight.

The improvements forming the subject matter of the present invention are preferably applicable to magnetic tape reels for computers.

What is claimed is:

1. A magnetic tape reel for computers, said reel comprising:
   a central part comprising:
      a driving hub having an annular collar extending radially outwardly from the outer surface of said hub;
      a driving ring concentric with said hub and having an annular collar extending radially inwardly from said inner surface of said ring; and
      means for interconnecting said hub and said ring;
   a first side flange formed with inner and outer substantially cylindrical welding surfaces projecting inwardly from the inner surface thereof and being connected to each said hub and said ring by means of respective first and second ultrasonic welds wherein said inner and outer cylindrical welding surfaces contact one side of said hub collar and said ring collar respectively; and a second side flange formed with inner and outer substantially cylindrical welding surfaces projecting inwardly from the inner surface thereof and being connected to each said hub and said ring by means of respective third and fourth annular ultrasonic welds wherein said inner and outer surfaces contact the other side of said hub collar and said ring collar respectively;

said rigid joining of said first and second side flanges with said hub and said ring by means of said annular ultrasonic welds forming a box-like structure having a high resistance to compression produced by tape being wound thereon.

2. A reel according to claim 1 wherein each said flange is provided with a joggle for housing the corresponding annular edges of said ring, so that a sharp edge appears between each said flange and said ring.

3. A reel according to claim 1 wherein said means for interconnecting said ring and said hub comprises a web integral with said hub, said ring being connected to said web by a plurality of ribs angularly separated from one another forming a free space between said ring and said web to avoid the formation of cavities on moulding and to maintain the cylindricity of said ring.

* * * * *